(12) United States Patent
Haas

(10) Patent No.: US 7,400,231 B2
(45) Date of Patent: Jul. 15, 2008

(54) SENSOR DEVICE, METHOD AND DEVICE FOR MONITORING A SENSOR DEVICE, AND SYSTEM HAVING A SENSOR DEVICE

(75) Inventor: Thomas Haas, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 249 days.

(21) Appl. No.: 11/197,281

(22) Filed: Aug. 4, 2005

(65) Prior Publication Data

US 2006/0028326 A1 Feb. 9, 2006

(30) Foreign Application Priority Data

Aug. 4, 2004 (DE) .................... 10 2004 037 875.4

(51) Int. Cl.
*B60R 25/10* (2006.01)

(52) U.S. Cl. .................. 340/426.33; 340/442; 340/447; 340/438

(58) Field of Classification Search ............ 340/426.33, 340/442, 443, 444, 445, 446, 447, 438; 701/35, 701/1, 36, 29
See application file for complete search history.

(56) References Cited

U.S. PATENT DOCUMENTS

| | | | | |
|---|---|---|---|---|
| 5,183,128 | A * | 2/1993 | Ito et al. .................... | 180/197 |
| 5,748,503 | A * | 5/1998 | Saeki et al. ................. | 702/148 |
| 6,690,271 | B2 | 2/2004 | Fischer et al. | |
| 6,701,234 | B1 * | 3/2004 | Vogelsang ................... | 701/35 |
| 6,748,799 | B2 | 6/2004 | Fischer et al. | |
| 7,254,994 | B2 * | 8/2007 | Schulze ....................... | 73/146 |
| 7,271,709 | B2 * | 9/2007 | Miller et al. ................ | 340/442 |
| 2003/0020604 | A1 | 1/2003 | Fischer et al. | |
| 2003/0079536 | A1 | 5/2003 | Fischer et al. | |
| 2004/0233050 | A1 * | 11/2004 | Burghardt ................... | 340/445 |

FOREIGN PATENT DOCUMENTS

| | | |
|---|---|---|
| DE | 40 19 501 A1 | 4/1991 |
| DE | 43 26 976 A1 | 2/1995 |
| DE | 101 35 936 A1 | 2/2003 |
| DE | 101 44 326 A1 | 4/2003 |
| EP | 0 421 065 A2 | 4/1991 |

* cited by examiner

*Primary Examiner*—Daryl C Pope
(74) *Attorney, Agent, or Firm*—Laurence A. Greenberg; Werner H. Stemer; Ralph E. Locher (57) ABSTRACT

A sensor device is disposed in a wheel. It contains an acceleration sensor, the measurement signal of which is representative of the acceleration of the sensor device. Detachment of the sensor device from its mounting position is detected according to the measurement signal of the acceleration sensor. The sensor device can also contain a position sensor, the measurement signal of which is representative of a relative position of the sensor device based on its mounting position. The sensor device can also contain a deformation measuring element disposed in such a way that a measurement signal of the deformation measuring element exhibits a characteristic oscillation if the sensor device has become detached from its mounting position.

14 Claims, 7 Drawing Sheets

SENSOR DEVICE, METHOD AND DEVICE FOR MONITORING A SENSOR DEVICE, AND SYSTEM HAVING A SENSOR DEVICE

BACKGROUND OF THE INVENTION

Field of the Invention

The invention relates to a sensor device disposed in a wheel, in particular in the wheel of a motor vehicle. It also relates to a method and a device for monitoring the sensor device, and to a system having the sensor device. The monitoring of parameters of a motor vehicle wheel can make a major contribution to the safety of the motor vehicle occupants. Monitoring of the tire pressure, in particular, plays a very important part in this. Falling tire pressure can provide an early warning of damage to the tire of a motor vehicle wheel. This results in that the attention of the driver of the motor vehicle can then be drawn to a damaged tire in good time, before the tire possibly bursts and there is thus considerable risk of an accident.

Published, non-prosecuted German patent application DE 101 35 936 A1 (corresponding to U.S. Patent Application Publication 2003/0020604 A1 and U.S. Pat. No. 6,690,271 B2) discloses a device for monitoring at least one parameter for a plurality of motor vehicle wheels. On each wheel the device has associated detector units, each having a transmitter unit that transmits a phase-modulated or frequency-modulated signal to a central evaluation and control unit. Each detector unit transmits, at specific time intervals, a brief signal containing a unique identifier. After a wheel change, in an assignment mode of the detector unit and of the central evaluation and control unit, the detector unit in question can be reassigned to the relevant wheel positions by registration of a profile of the mean reception power for each detector unit as a function of the angular position of the respective wheel and by comparison of this with stored signature information. Each detector unit contains an acceleration sensor. The measurement signal of the acceleration sensor is used to detect whether there is a wheel revolution.

Published, non-prosecuted German patent Application DE 101 44 326 A1 (corresponding to U.S. Patent Application Publication No. 2003/0079536 A1 and U.S. Pat. No. 6,748, 799 B2) discloses a method and a system for monitoring tire air pressure. A pressure sensor for registering the air pressure inside the tire is disposed in the motor vehicle tire. The output signal from the pressure sensor is transmitted to an evaluation unit via a radio transmission link. The air pressure inside the tire is measured and compared with an optimum tire pressure. If the two pressures differ by more than a predetermined deviation, a deviation signal is generated.

For a sensor device to function properly, it is important for the device to be located in its predefined mounting position inside the wheel. The detachment of the sensor device from its mounting position can lead, first, to failure of the sensor device but also, second, to the destruction of the tire.

SUMMARY OF THE INVENTION

It is accordingly an object of the invention to provide a sensor device, a method and a device for monitoring the sensor device, and a system having the sensor device which overcomes the above-mentioned disadvantages of the prior art devices and methods of this general type, which makes it possible to monitor whether the sensor device has become detached from its mounting position. A further object of the invention is to provide a sensor device configured to detect whether the device is located in its mounting position. A further object of the invention is to provide a system configured to detect whether a sensor device is located in its mounting position.

According to a first aspect, the invention is distinguished by a method and corresponding device for monitoring a sensor device disposed in a wheel. The sensor device contains an acceleration sensor, the measurement signal of which is representative of the acceleration of the sensor device, especially centrifugal acceleration of the sensor device, whenever it is duly located in its mounting position. Detachment of the sensor device from its mounting position is detected according to the measurement signal of the acceleration sensor. With regard to the first aspect, the invention proceeds from the perception that the measurement signal of the acceleration sensor alters if the sensor device becomes detached from its mounting position. The invention thus facilitates easy detection of the detachment of the sensor device from its mounting position. Furthermore, sensor devices disposed in the wheel are frequently provided with an acceleration sensor anyway, for the purpose of detecting whether the wheel revolves. The acceleration sensor that is provided anyway is thus also used to monitor the sensor device.

In an advantageous development of the invention, the detachment of the sensor device from its mounting position is detected according to the measurement signal of the acceleration sensor and a vehicle speed of the motor vehicle on which the wheel is disposed. Reliable detection of whether the sensor device has become detached from its mounting position is therefore possible, especially if the sensor device is configured to register centrifugal acceleration in its mounting position, since centrifugal force and centrifugal acceleration are a function of vehicle speed.

In this connection, it is particularly advantageous if a correlation coefficient is established as a function of the measurement signal of the acceleration sensor and of the square of the vehicle speed and if the detachment of the sensor device from its mounting position is detected according to the correlation coefficient. The value of the correlation coefficient is only a function of a revolution radius of the tire and of the current position of the sensor device. The correlation coefficient thus facilitates simple and precise monitoring of the sensor device.

According to a further advantageous development of the first aspect of the invention, a motor vehicle is assigned a plurality of wheels, each having a sensor device. The detachment of the relevant sensor device(s) from its mounting position is detected according to a mutual comparison of the measurement signals of different sensor devices or of quantities derived from such signals. This is based on the perception that, if all the sensor devices are located in their mounting position, the acceleration values of the individual sensor devices will differ only within a predefined tolerance band. The mutual comparison of the measurement signals, which comparison can also include a correlation of the measurement signals or a correlation of the characteristic quantities deduced from the measurement signals, for example the correlation coefficient, thus permits the detachment of one of the sensor devices from its mounting position to be simply and reliably detected. This is also based on the perception that it is extremely unlikely that two or more sensor devices will simultaneously become detached from their mounting position.

According to a further advantageous development of the first aspect of the invention, at a vehicle speed lower than a predefined vehicle speed threshold, the detachment of the sensor device from its mounting position is detected according to a measure for the mutual deviation of a plurality of values, measured at time intervals, of the measurement signal of the acceleration sensor or of quantities derived therefrom. In this context, the measure for the deviation can, for example, be the sum of the deviations or preferably also the variance or standard deviation thereof.

This is based on the perception that, with an appropriately selected vehicle speed threshold, below this the centrifugal force acting on the sensor device through rotation of the tire is less than the gravitational force of the sensor device. If the sensor device has become detached from its mounting position therefore, it will in this event tumble around in the tire. As a consequence, the acceleration sensor constantly changes its position relative to the wheel and thus, at one instant, for example, registers the centrifugal acceleration, at a subsequent instant then registers tangential acceleration and, at a further subsequent instant, registers axial acceleration of the wheel. As a consequence, the measurement signals differ considerably at the relevant successive instants.

According to a further advantageous development of the first aspect of the invention, at a vehicle speed higher than the predefined vehicle speed threshold, the detachment of the sensor device from its mounting position is detected if the measurement signal or its value falls below a predefined threshold or if measured values of the measurement signal do not change in correlation with the vehicle speed then prevailing. This is based on the perception that the acceleration sensor in the sensor device is normally configured in such a way that it can register only either positive acceleration or negative acceleration. Appropriate selection of the threshold thus permits detection of the fact that the location of the acceleration sensor, in the direction in which it registers acceleration, is rotated by approximately 180°. This is then an indicator that the sensor is not located in its mounting position.

If measured values of the measurement signal do not change in correlation with the vehicle speed, this is an indicator that the acceleration sensor is located in a radial position other than that of its mounting position.

According to a further advantageous development of the first aspect of the invention, the sensor device contains a temperature sensor. The detachment of the sensor device from its mounting position is detected according to the temperature registered by the temperature sensor. This is based on the perception that the temperatures of a wheel rim and of an inner wall of a tire of the wheel normally differ considerably. The temperature registered is therefore representative of the current position of the sensor device. The additional inclusion of temperature permits detachment of the sensor device from its mounting position to be detected even more reliably. However, the detachment of the sensor device from its mounting position can optionally also be detected independently of an evaluation of the measurement signals of the acceleration sensor.

According to a further advantageous development of the first aspect of the invention, the detachment of the sensor device from its mounting position is detected according to a measure for a characteristic oscillation of the measurement signal of the acceleration sensor. This is based on the perception that, when the sensor device rests against the inner wall of the tire, it is subject to very intense vibrations as a result of the deformation of the tire as it travels, especially at the point of contact with the roadway surface, referred to as the contact area. This deformation can lead to very large forces of acceleration of, for example, up to 6000 g. The measure evaluated for the characteristic oscillation can, for example, be the amplitude of the characteristic oscillation.

According to a further advantageous development of the first aspect of the invention, the sensor device is configured to transmit an information signal. The information signal can, for example, contain the measurement signal of the acceleration sensor or an information quantity derived therefrom.

The detachment of the sensor device from its mounting position is detected if, for a predefined period of time, no information signal is received by the device for monitoring the sensor device. This is based on the perception that lack of an information signal is an indicator that the sensor device is no longer in working order. The sensor device may not be in working order because it has previously become detached from its mounting position. This can reduce the likelihood, in particular, of the incorrect detection of the detachment of the sensor device from its mounting position. According to a second aspect, the invention is distinguished by a method and corresponding device for monitoring a sensor device disposed in a wheel. The sensor device is configured to transmit an information signal. Detachment of the sensor device from its mounting position is also detected according to a measure for the signal strength of the information signal. This aspect of the invention is based on the perception that the signal strength of the information signal is clearly dependent upon the current position of the sensor device relative to the wheel. One particular influencing factor in this connection is that the wheel rim has a considerable shielding effect with respect to the information signal transmitted by the sensor device. The measure used for the signal strength of the information signal can thus preferably be, for example, the received field strength of the information signal, known as an RSSI level.

According to a third aspect, the invention is distinguished by a sensor device which can be disposed in a wheel in a mounting position and which contains a position sensor, the measurement signal of which is representative of a relative position of the sensor device based on the mounting position. A sensor device of this kind can be monitored to determine whether it has become detached from its mounting position through simple evaluation of the measurement signal representative of the relative position of the sensor device.

In this connection, it is advantageous if the position sensor is a magnetic field sensor. A magnetic field sensor, especially if it cooperates with a permanent magnet, is distinguished by a very low energy requirement and is not susceptible to wheel rim interference.

In this connection, it is also advantageous if the position sensor contains a switch, the position of which is dependent upon the relative position of the sensor device based on the mounting position. The position sensor can thus be of a very simple configuration, and yet it can be used to facilitate simple monitoring of whether the sensor device is located in its mounting position.

The position sensor of the sensor device can also contain two contacts that, only in the mounting position of the sensor device, are electrically coupled to an electric conductor disposed on the wheel. The position sensor can thus also be of a very simple configuration, and yet its measurement signal can be used to monitor whether the sensor device is located in its mounting position.

According to a fourth aspect, the invention is distinguished by a sensor device which can be disposed in a wheel in a mounting position and which contains at least one deformation measuring element disposed so that a measurement signal of the deformation measuring element exhibits a characteristic oscillation if the sensor device has become detached from its mounting position. Suitable evaluation of the measurement signal of the deformation measuring element thus enables detachment of the sensor device from its mounting position to be easily and reliably detected. The deformation measuring element can, for example, be in the form of a strain cell or piezoelectric element.

According to a fifth aspect, the invention is distinguished by a method and corresponding device for monitoring the sensor device according to the fourth aspect of the invention, wherein the detachment of the sensor device from its mounting position is detected according to a measure for a characteristic oscillation of the measurement signal of the deformation measuring element.

According to this fifth aspect, the invention is based on the perception that, when the sensor device rests against the inner wall of the tire, it is subject to very intense vibrations as a result of the deformation of the tire as it travels, especially at the point of contact with the roadway surface. The measure evaluated for the characteristic oscillation can, for example, be the amplitude of this characteristic oscillation.

According to a sixth aspect, the invention is distinguished by a system having a sensor device, which is disposed in a wheel in a mounting position, and having a further sensor device, which includes a sensor element configured to detect vibrations transferred to the wheel by a detached sensor device. This sixth aspect of the invention is based on the perception that a sensor device detached from the mounting position transfers vibrations to the wheel. These vibrations can be caused by the sensor device striking the tire or the wheel rim and, at a high rotational speed of the tire, by the impact of the measuring unit, which is pressed against the inner wall of the tire, on the point of contact with the roadway surface, referred to as the contact area. The sensor device thus generates secondary structure-born noise or airborne noise.

The further sensor device can advantageously be disposed on the wheel. It can thus simply be a component of the wheel, which simplifies possibly complex mutual adaptation of the sensor device and the further sensor device. With such a configuration, moreover, the further sensor device is substantially separated from vibrations caused by other components of the motor vehicle.

Alternatively, the further sensor device can also be disposed on a component of a motor vehicle, which component is connected to the wheel in such a way that vibrations of the wheel are transferred to the component. It must therefore be connected to the wheel in such a way that the structure-born noise generated by the wheel is transferred to it. The advantage of this is that the further sensor device does not have to withstand such great mechanical stresses as in the region of the wheel. It can therefore advantageously also form part of a unit having an optionally decentralized receiver unit.

In an advantageous development of this aspect of the invention, a mechanical vibration element is disposed in such a way that, when the sensor device becomes detached from its mounting position, the element is excited to vibrations. Any detachment of the sensor device from its mounting position thus leads to the generation of particularly characteristic vibrations, which result in structure-borne sonic vibrations. The detachment of the sensor device from its mounting position can therefore be very reliably detected.

According to a seventh aspect, the invention is distinguished by a system having a sensor device, which is disposed in a wheel, and having a monitoring unit, which is connected to the sensor device in such a way that it detects detachment of the sensor device from its mounting position, and which is configured to generate a warning signal if it detects the detachment of the sensor device from its mounting position. The monitoring unit can thus, for example, be electrically coupled to the sensor device and can detect from the presence or absence of the electric coupling whether or not the sensor device has become detached from its mounting position. In this case, the detachment of the sensor device can also be easily detected by the monitoring unit if the sensor device has been destroyed after becoming detached from the mounting position.

Other features which are considered as characteristic for the invention are set forth in the appended claims.

Although the invention is illustrated and described herein as embodied in a sensor device, a method and a device for monitoring the sensor device, and a system having the sensor device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a motor vehicle 1 that has wheels 2, 4, 6, 8. The wheels 2, 4, 6, 8 each contain a rim 10 (FIG. 3) and a tire 12.

Figure 1:
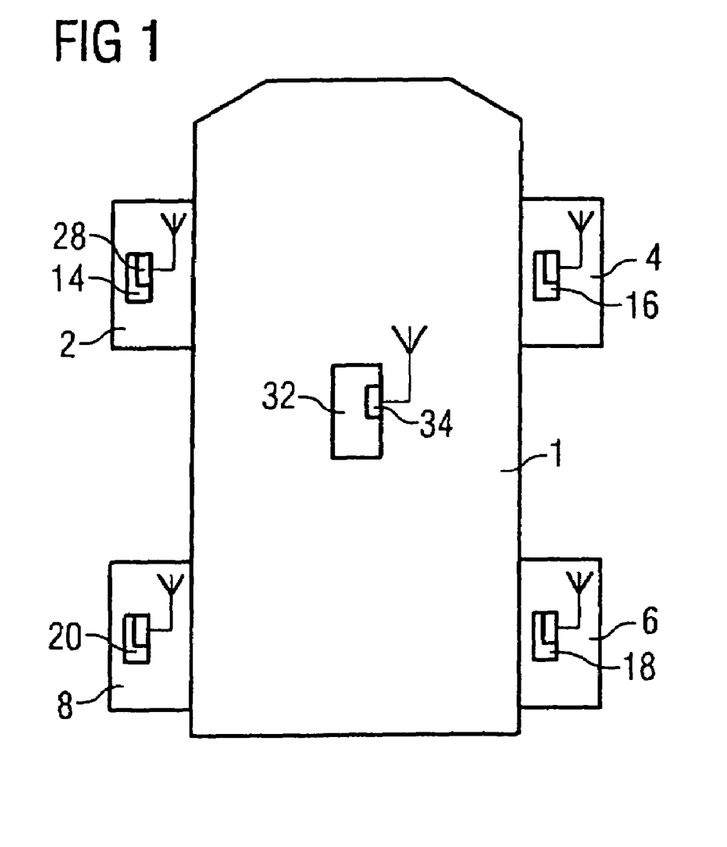
FIG. 1 is an illustration of a motor vehicle having wheels in which sensor devices are disposed according to the invention.

The wheels 2, 4, 6, 8 are each provided with sensor devices 14, 16, 18, 20 (FIG. 1). The sensor devices 14, 16, 18, 20 are each duly disposed in a mounting position MP in the wheel 2, 4, 6, 8. Thus they can, for example, be fixedly mounted on the rim 10 of the wheel 2, 4, 6, 8, for example by a bolted joint or riveted joint. They can, however, also be glued to the wheel rim 10 by a suitable adhesive. Alternatively, they can also be secured in the mounting position MP by clamping tape. The clamping tape is preferably clamped on the wheel rim 10. Alternatively, the mounting position of the sensor device 14, 16, 18, 20 can also be located next to the appropriate valve of the wheel, and thus the sensor device 14, 16, 18, 20 can be mechanically connected to the valve.

The sensor device 14 to which the wheel 2 is assigned is described below by way of example with reference to a plurality of embodiments. The other sensor devices 16, 18, 20 are of a corresponding configuration.

The sensor devices 14, 16, 18, 20 each have a transmitter unit 28, by which they transmit an information signal IS, which is preferably a frequency-modulated signal.

In the motor vehicle 1 there is provided a monitoring device 32, which can also be referred to as a device for monitoring the sensor device 14, 16, 18, 20. The monitoring device 32 contains a central receiver unit 34, which is configured to receive information signals transmitted by the relevant sensor units 28. Alternatively, in place of the central receiver unit 34 there can also be a plurality of decentralized receiver units, which are then each assigned to at least one sensor device 14, 16, 18, 20. The monitoring device 32 has a program memory and a data memory and is provided with an evaluation unit, in which the received information signal IS is evaluated for the purpose of monitoring the relevant sensor device 14, 16, 18, 20.

The sensor device 14 has a non-illustrated tire pressure sensor. The measurement signal of the tire pressure sensor, optionally already conditioned, is transmitted by the transmitter unit 28 to the receiver unit 34 of the monitoring device 32 by the information signal IS. The monitoring device 32 can thus compare each registered tire pressure with a predefined desired tire pressure value and, in this way, can detect if the tire pressure values in one of the tires 12 of the wheels 2, 4, 6, 8 are undesirable. Then, if appropriate, it can take action that will lead to safer driving. Action of this kind can, for example, be a warning signaled to the driver of the motor vehicle 1.

Figure 2:
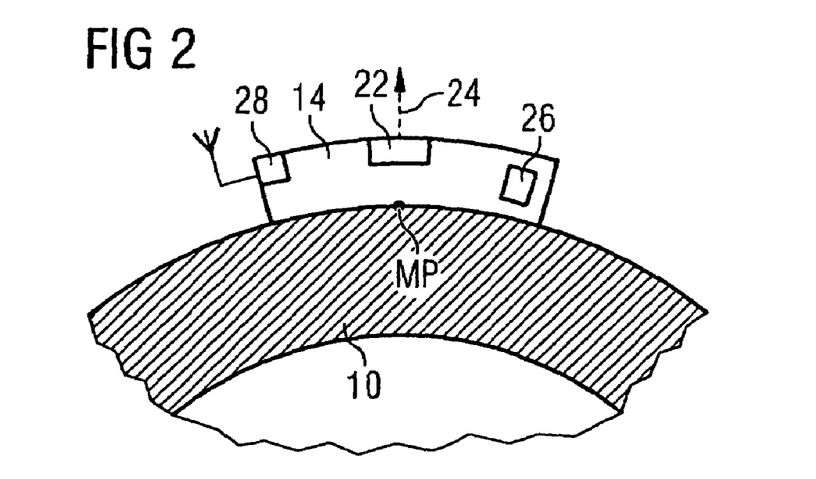
FIG. 2 is a diagrammatic, cut-out of a wheel as shown in FIG. 1 with a first embodiment of the sensor device.

The sensor device 14 also contains an acceleration sensor 22. The acceleration sensor 22 is preferably configured to register centrifugal acceleration and therefore acceleration along its line of action 24. The acceleration sensor 22 is usually configured to register acceleration in the direction of the arrow indicating its line of action. In the event of acceleration in the opposite direction to the direction of the arrow indicating the line of action 24, the measurement signal of the acceleration sensor 22 usually has a predefined minimum value. The acceleration sensor 22 can, for example, be of a resistive or capacitive configuration.

The sensor device 14 can also be assigned a temperature sensor 26. The temperature sensor 26 registers a temperature of the sensor device 14. Alternatively or additionally, the acceleration sensor 22 can also be configured to register tangential acceleration or axial acceleration. If the sensor device 14 becomes detached from its designated mounting position MP, the sensor device can generally move freely inside the space between the wheel rim 10 and an inner wall of the tire 12. A reference character r indicates the radius to the center of the wheel rim from the position POS of the sensor device 14. A reference character R indicates the radius from the center of the wheel rim to the inner wall of the tire.

If the sensor device has become detached from its mounting position MP, during the rotation of the wheel 2 the device can tumble around in the region between the wheel rim 10 and the inner wall of the tire, provided that the centrifugal force acting on the sensor device 14 is less than the gravitational force acting on the sensor device. At appropriately low vehicle speeds VS, the sensor device 14 thus tumbles around inside the tire 12. As a consequence, the line of action 24 of the acceleration sensor 22 then coincides only randomly with the direction of the centrifugal acceleration. Rather, the line of action can, for example, at times also coincide with the direction of tangential acceleration or axial acceleration or a combination of tangential, radial or centrifugal acceleration. In this situation, the measurement signal of the acceleration sensor 22 therefore has a very high variance even at a constant vehicle speed VS. One particular reason for this is that the centrifugal acceleration is usually at least one order of magnitude and frequently two or three orders of magnitude greater than the tangential or axial acceleration acting on the sensor device 14. In this situation, the relative position POS of the sensor device 14 inside the tire varies in a statistically random manner, and in FIG. 6 fifth and sixth positions P5 and P6 are, for example, shown for the sensor device 14.

Figure 3:
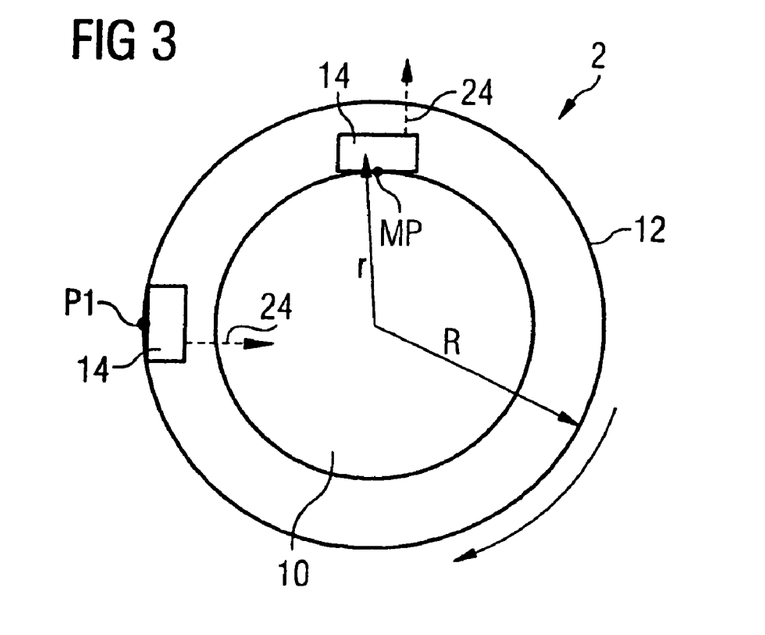
FIG. 3 is an illustration showing the first embodiment of the sensor device in different positions.
Figure 4:
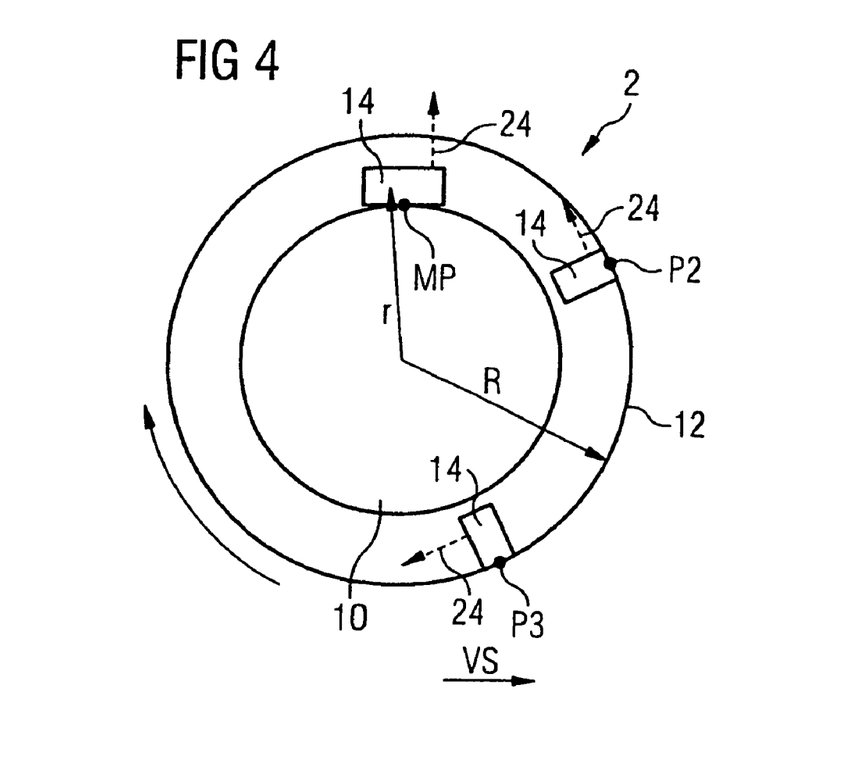
FIG. 4 is an illustration of the first embodiment of the sensor device in further different positions.

FIG. 3 shows a situation where the vehicle speed VS is so high that the centrifugal force acting on the sensor device 14 is greater than the gravitational force. In this situation, the sensor device is pressed against the inner wall of the tire 12 in a first position P1. In the first position P1, the sensor device is, in a radial direction relative to the center of the wheel rim, rotated by approximately 180° in terms of its line of action 24 relative to the mounting position MP. As a result, the measurement signal of the acceleration sensor 22 of the sensor device 14 has a virtually unchanged minimum value even if the vehicle speed VS continues to increase. FIG. 4 shows second and third positions P2, P3 of the sensor device 14, which has become detached from its mounting position MP, again for a vehicle speed VS so high that the centrifugal force acting on the sensor device 14 is greater than the gravitational force of the sensor device 14. In the second and third positions P2 and P3, the line of action 24 of the acceleration sensor is aligned substantially in a tangential direction to the wheel. As a consequence, a measurement signal MS_B of the acceleration sensor 24 correlates with the tangential acceleration, and thus the measurement signal MS_B in the relevant driving situations has an acceleration value which is orders of magnitude lower.

Figure 5:
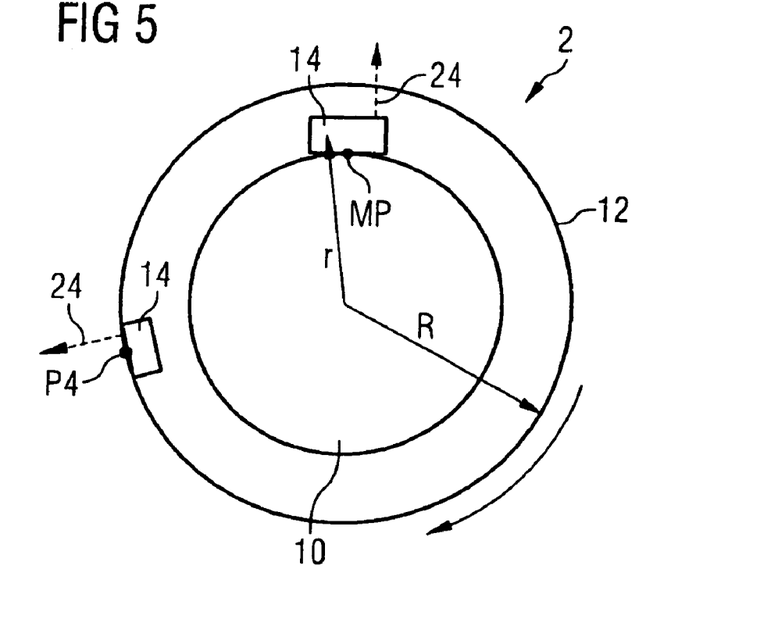
FIG. 5 is an illustration showing the first embodiment of the sensor device in yet further different positions.

FIG. 5 shows a sensor device 14, which is detached from its mounting position MP, in a fourth position P4, in which, in terms of the alignment of its line of action 24 in the direction of the relevant arrow, the device has, in a radial direction relative to the center of the wheel rim, an alignment identical to that of its mounting position MP except only that the radius r corresponds to the radius R. In this event, by comparison with the mounting position MP the acceleration sensor 22 therefore registers, in the fourth position P4, an increased acceleration which corresponds to the difference between the radii r in the mounting position MP and the radius R, even at the same vehicle speed VS.

Figure 7:
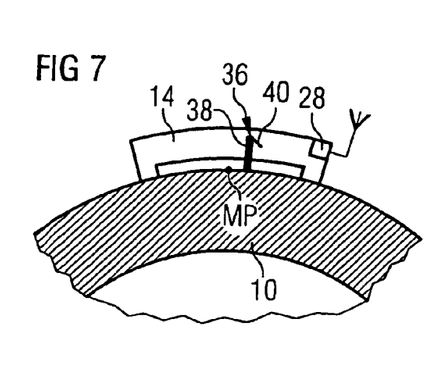
FIG. 7 is a diagrammatic, cut-out view of a wheel as shown in FIG. 1 with a second embodiment of the sensor device.

FIG. 7 shows a second embodiment of the sensor device 14. It contains a switch 36 having a pin 38 and a switch contact 40. If the sensor device 14 is in its mounting position MP, the pin 38 acts on the switch contact 40 so that, for example, an electric circuit is closed. If the sensor device 14 subsequently becomes detached from its mounting position, then, for example, a non-illustrated spring presses the pin 38 away from the switch contact 40, which then, for example, leads to an interruption of the above-mentioned electric circuit. The switch 36 is therefore a simple position sensor, the measurement signal of which can be used to detect whether the sensor device 14 is located in its mounting position MP or whether it is located out of its mounting position MP. The measurement signal assigned to the switch 40 or a correspondingly conditioned signal is then transmitted from the transmitter unit 28 by the information signal IS.

In a third embodiment (FIG. 8) of the sensor device 14, a first contact 42 and a second contact 44 are disposed in a spaced-apart manner in the sensor device 14. In the mounting position MP of the sensor device 14, contact is established between the first and second contacts 42, 44 and an electric conductor 46 disposed on the wheel rim 10. In the mounting position MP of the sensor device 14 an electric circuit is thus closed by suitable further circuit components.

Figure 8:
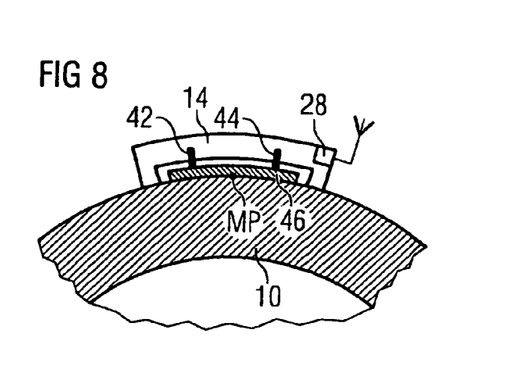
FIG. 8 is a diagrammatic, cut-out view of the wheel as shown in FIG. 1 with a third embodiment of the sensor device.

If the sensor device 14 becomes detached from its mounting position MP, the first and second contacts 42, 44 also become detached from the electric conductor 46 with the result that the electric circuit is interrupted. Appropriate signal evaluation permits easy detection of whether the sensor device 14 is located in its mounting position MP or whether it is located out of its mounting position MP.

Figure 9:
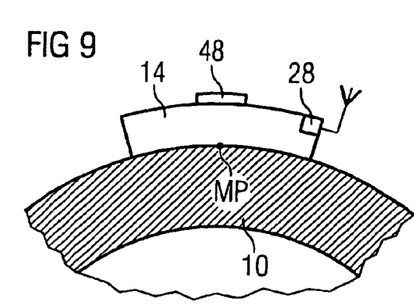
FIG. 9 is a diagrammatic, cut-out view of the wheel as shown in FIG. 1 with a fourth embodiment of the sensor device.

In a fourth embodiment of the sensor device 14 (FIG. 9) a deformation measuring element 48 is disposed on the sensor device 14. The deformation measuring element 48 can, for example, be a strain cell or piezoelectric element. If the sensor device 14 becomes detached from its mounting position MP, the deformation measuring element 48 registers deformations of the sensor device 14 caused by it striking the inner wall of the tire 12 and by the impact of the sensor device 14, which is pressed against the inner wall of the tire, on the point of contact with the roadway surface, referred to as the contact area. As a result of the cyclic deformation of the tire 12 in the region of each position in which the sensor device is located, the sensor device 14 is therefore also deformed cyclically. This leads to a characteristic oscillation of the measurement signal of the strain cell 48. While a motor vehicle is travelling, accelerations of up to 6000 g can occur on the inner wall of the tire. The measurement signal of the deformation measuring element 48, optionally conditioned in an appropriate manner, is then transmitted as part of the information signal IS from the transmitter unit 28 to the central receiver unit 34 of the monitoring device 32.

A fifth embodiment of the sensor device 14 (FIG. 10) contains not only the sensor device 14 but also a further sensor device 50. The further sensor device 50 contains a sensor element configured to detect vibrations transferred to the wheel by a detached sensor device, that is to say especially the sensor device 14. This can, for example, be a deformation measuring element according to the fourth embodiment shown in FIG. 9, an acceleration sensor or a structure-born noise microphone.

Figure 10:
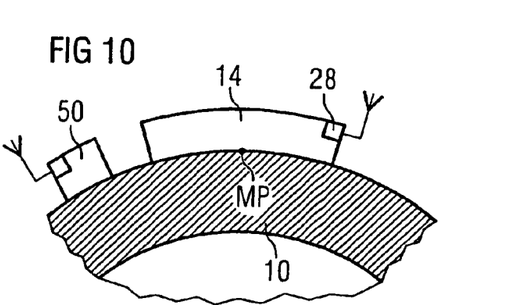
FIG. 10 is a diagrammatic, cut-out view of the wheel as shown in FIG. 1 with a fifth embodiment of the sensor device.

With a system of this kind formed of the sensor device 14 and the further sensor device 15, the detachment of the sensor device 14 from its mounting position MP can be detected by the further sensor device 50 on the basis of the detected structure-born noise caused by the sensor device 14 striking, for example, the inner wall of the tire 12 after becoming detached from the mounting position MP. In this event, therefore, the further sensor device 50 can, by a transmitter unit assigned to it, transmit an appropriate signal to the central receiver unit 34; if the sensor device 14 has been destroyed, the detachment of the sensor device from its mounting position can thus also be signaled to the monitoring device 32.

The further sensor device 50 can also be disposed on a component of the motor vehicle 1, which component is connected to the wheel in such a way that vibrations of the wheel are transferred to it. It can, for example, be connected to a wheel housing, a suspension strut, a wheel suspension device or the like.

Figure 11:
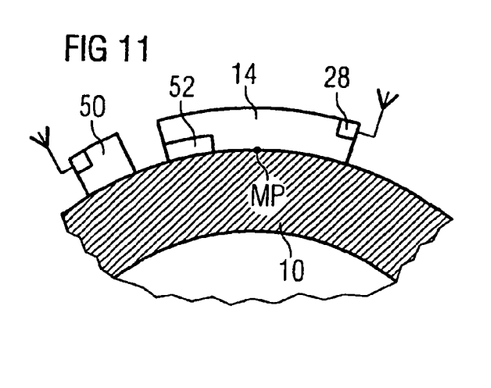
FIG. 11 is a diagrammatic, cut-out view of the wheel as shown in FIG. 1 with a sixth embodiment of the sensor device.

According to a sixth embodiment of the sensor device 14 (FIG. 11), the sensor device 14 has an associated mechanical vibration element 52. The mechanical vibration element 52 can contain a spring-mass vibrator which, when the sensor device 14 becomes detached from its mounting position MP, is caused to vibrate, the vibration then being transferred, preferably in the form of structure-born noise, via the wheel rim 10 to the further sensor device 50, where it is registered by the sensor element there provided.

Figure 12:
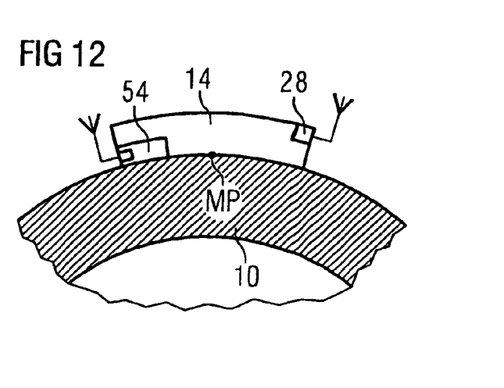
FIG. 12 is a diagrammatic, cut-out view of the wheel as shown in FIG. 1 with a seventh embodiment of the sensor device.

In the seventh embodiment of the sensor device 14, the device has an associated monitoring unit 54. The monitoring unit 54 is connected to the sensor device 14 in such a way that it detects detachment of the sensor device 14 from its mounting position MP. For this purpose the unit can, for example, be connected to the sensor device 14 by a switch contact which is closed whenever the sensor device 14 is in its mounting position MP and which is otherwise open. Appropriate evaluation of the position of the switch contact of the monitoring unit 54 thus enables the monitoring unit 54 automatically to detect if the sensor device 14 has become detached from its mounting position MP.

The monitoring unit 54 also has an associated further transmitter unit configured to transmit a warning signal WS to the central receiver unit 34 if it has detected detachment of the sensor device from its mounting position MP.

Figure 13:
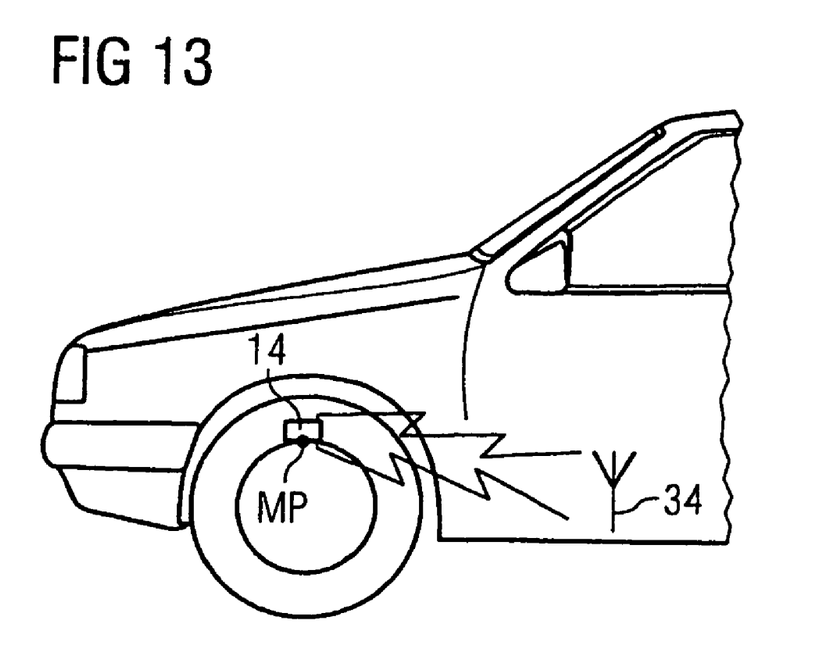
FIG. 13 is an illustration of the wheel as shown in FIG. 1 with an eighth embodiment of the sensor device.
Figure 14:
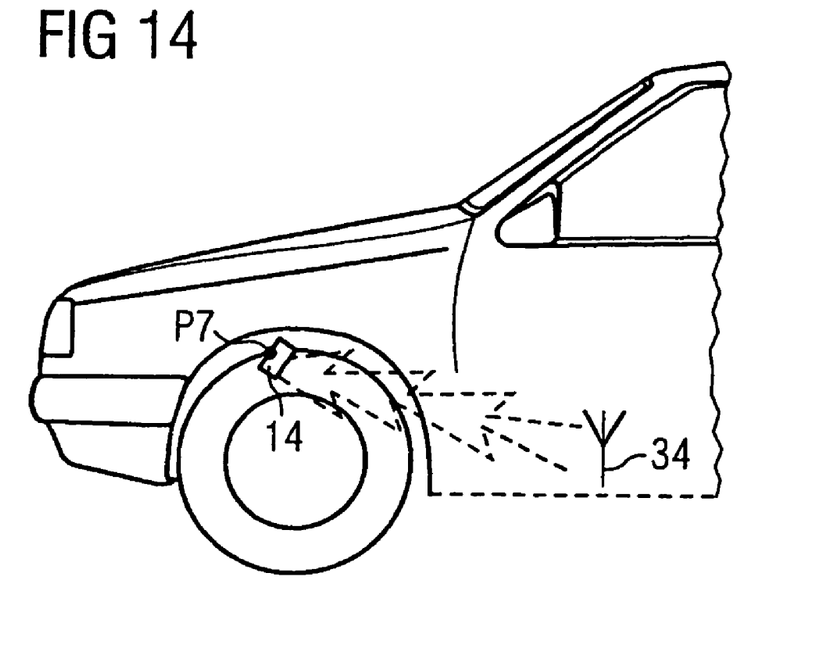
FIG. 14 is an illustration of the wheel as shown in FIG. 1 with the eighth embodiment of the sensor device disposed out of its mounting position.

In an eighth embodiment of the sensor device, the device is likewise duly disposed at its mounting position MP. The transmitter unit 28 of the sensor device 14 transmits the information signal with a predefined signal strength. The central receiver unit 34 receives the information signal IS. In this case, the evaluation unit of the monitoring device 32 is configured to establish a measure that is characteristic of the signal strength of the information signal IS. In the case of a modulated information signal this measure can, for example, be the amplitude of the carrier signal. This embodiment is based on the perception that the signal strength of the information signal IS received by the central receiver unit 34 alters distinctly if the sensor device 14 has moved away from its mounting position MP to a seventh position P7 on the inner wall of the tire (FIG. 14). This is symbolized by the broken line indicating the transmission of the information signal in FIG. 14, whereas in FIG. 13 the line is continuous.

The distinct difference in the signal strength is attributable to the shielding effect of different parts of the motor vehicle body, and especially of the wheel rim 10. It has thus been shown, in particular, that the shielding effect of the wheel rim has a very considerable influence. As a result, even only a relatively small change in the position of the sensor device 14 causes a significant change in the signal strength of the information signal IS received by the central receiver unit 34.

The above-described different embodiments of the sensor device 14 and of the further sensor device 50 and of the monitoring unit 52 can also be present in any combination. Thus, for example, the sensor device 14 can contain not only the acceleration sensor 22 but also the deformation measuring element 48 and/or the switch 36 and/or the first and second contacts 42, 44.

In a program memory of the monitoring device 32 there is stored a program that is run while the motor vehicle 1 is travelling. The program for all the above-described embodiments of the sensor device 14 is explained below with reference to the flow charts in FIGS. 15 and 16. The program is suitable for the monitoring of all eight embodiments of the sensor device described with reference to FIGS. 2 to 13. If some of the elements specific to the particular embodiment are not present in the actual realization of a system consisting of the sensor device 14 and the monitoring device 32, corresponding steps of the program can optionally be omitted.

Figure 15:
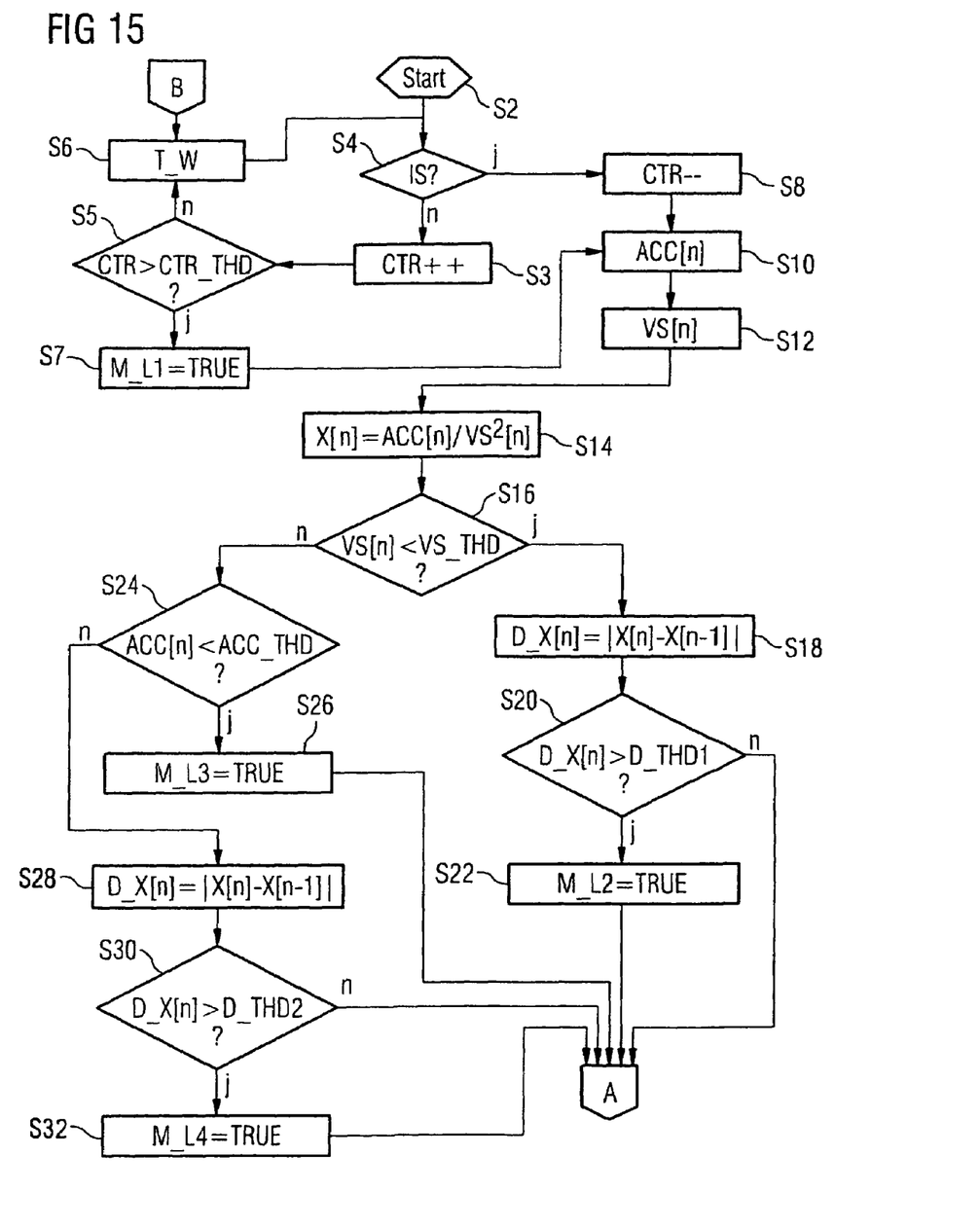
FIGS. 15 and 16 are flow charts of a program stored in a monitoring device.

The program is initiated in a step S2 in which variables are optionally initialized. The program can, for example, be initiated close in time to the engine start of an internal combustion engine which is likewise disposed in the motor vehicle 1.

A step S4 checks whether an information signal IS has been received by the central receiver unit 34. If it has not, in a step S3 a counter CTR is incremented, for example by the value one. A step S5 then checks whether the counter CTR has a value greater than a counter threshold CTR_THD. If it has not, processing is continued in a step S6, in which the program pauses for a predefined waiting time T_W, during which the computing capacity of the monitoring device can optionally be used for other tasks. Following step S6, processing is resumed in step S4.

If, on the other hand, the condition in S5 is fulfilled, processing is continued in a step S7, in which a first "detached" flag M_L1 is assigned a truth value TRUE.

If, on the other hand, it was found in step S4 that the information signal IS has been received again since the last time step S4 was performed, the counter CTR is decremented in step S8. The counter is, however, preferably decremented only to a predefined value, e.g. zero.

In step S10 a current acceleration ACC[n] is established as a function of the information signal IS. An "n" denotes, in each case, a current value of the relevant quantity and thus the value of the current computation cycle. An "n−1" denotes a last value of the relevant quantity, that is to say, the value of the directly preceding computation cycle of the program. The current acceleration ACC[n] is preferably the centrifugal acceleration registered by the acceleration sensor 22 whenever the sensor device 14 is in its mounting position MP.

In step S12 the current vehicle speed VS[n] is then established. This can, for example, be made available through the evaluation of relevant sensor information by an engine management system.

In step S14 a current correlation coefficient X[n] is established from the quotient of the current acceleration ACC[n] and the square of the current vehicle speed VS[n]. The correlation coefficient X is distinguished by the fact that its value is a function only of the distance between the current position POS of the sensor device 14 and the center of the wheel rim and the radius R, that is to say the revolution radius of the tire. The correlation coefficient X thus has a virtually constant value as long as the sensor device 14 does not alter its position POS. If the sensor device 14 becomes detached from its mounting position MP, the correlation coefficient X also changes.

A step S16 then checks whether the current vehicle speed VS[n] is lower than a predefined vehicle speed threshold VS_THD. The predefined vehicle speed threshold VS_THD is advantageously predefined such that, at vehicle speeds VS higher than the vehicle speed threshold VS_THD, the centrifugal force acting on the sensor device 14 is greater than the gravitational force acting on the sensor device 14. The vehicle speed threshold VS_THD is preferably selected such that, at the vehicle speed VS which corresponds to it, the centrifugal force is only negligibly greater than the gravitational force of the sensor device.

If the condition in step S16 is fulfilled, in step S18 a current deviation value D_X[n] is established as a function of the magnitude of the deviation between the current correlation coefficient X[n] and the last correlation coefficient X[n−1].

Figure 6:
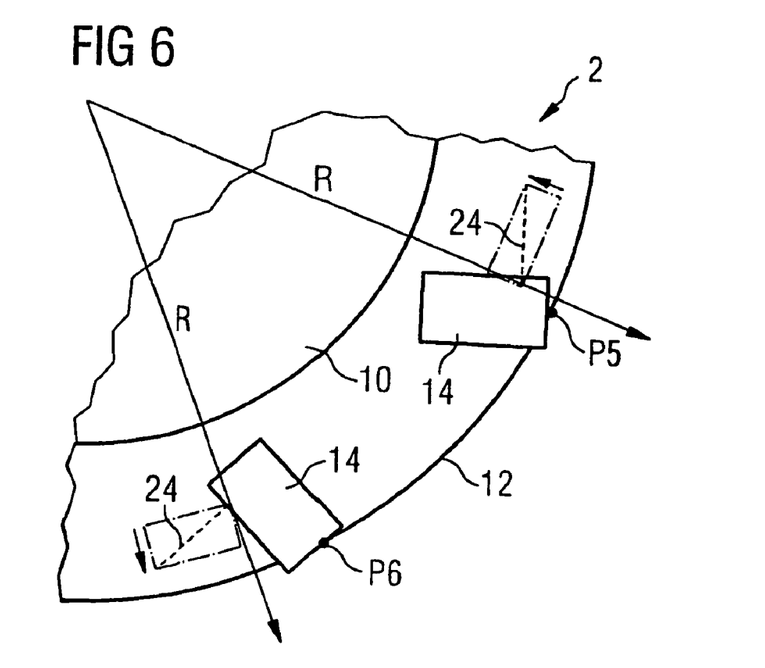
FIG. 6 is an illustration showing the first embodiment of the sensor device in still further different positions.

Step S20 checks whether the current deviation value D_X[n] of the correlation coefficient X is greater than a first correlation coefficient threshold D_THD1. If it is, this is an indicator that the sensor device 14 is tumbling around in the space between the wheel rim 10 and the inner wall of the tire, as shown in FIG. 6. If the condition in step S20 is fulfilled, processing is continued in step S22, in which a second "detached" flag M_L2 is assigned the truth value TRUE. Processing is then continued in a further step S34, which is explained in detail below.

If, on the other hand, the condition in step S20 is not fulfilled, processing is continued in step S34.

Alternatively, another measure for the deviation of the correlation coefficient X can be established in step S18. Thus, for example, a variance or standard deviation of the correlation coefficient X can be established also as a function of values of the correlation coefficient X further back in time, and this can then be compared with an appropriately adjusted threshold in step S20.

Step S24 checks whether the current acceleration ACC[n] is less than an acceleration threshold ACC_THD. The acceleration threshold ACC_THD is preferably selected such that it corresponds to the acceleration ACC minimally registered by the acceleration sensor 22. If the current acceleration ACC[n] is less than the acceleration threshold ACC_THD, this is thus an indicator that the sensor device 14 has become detached from its mounting position MP and that the sensor device 14 is located in the first position P1. If the condition in step S24 is fulfilled, in a step S26 a third "detached" flag is assigned the truth value TRUE. If, on the other hand, the condition in step S24 is not fulfilled, the current deviation value D_X[n] of the correlation coefficient X is established in a step S28 corresponding to step S18.

Step S30 then checks whether the current deviation value D_X[n] of the correlation coefficient X is greater than a second correlation coefficient threshold D_THD2. If the condition in step S30 is fulfilled, this is an indicator that the sensor device 14 has become detached from its mounting position and is located in one of the second or third positions P2, P3 (see FIG. 4). Alternatively, in step S28 the deviation value D_X can be established also as a function of a correlation coefficient X which is further back in time, and which is so far back in time that account is thus taken of the length of time that the sensor device 14 takes from becoming detached from the mounting position MP to finally being located in one of the second or third positions P2 or P3. The second correlation coefficient threshold D_THD2 preferably has a smaller value than the first correlation coefficient threshold D_THD1.

If the condition in step S30 is fulfilled, a fourth "detached" flag M_L4 is assigned the truth value TRUE in step S32.

Figure 16:
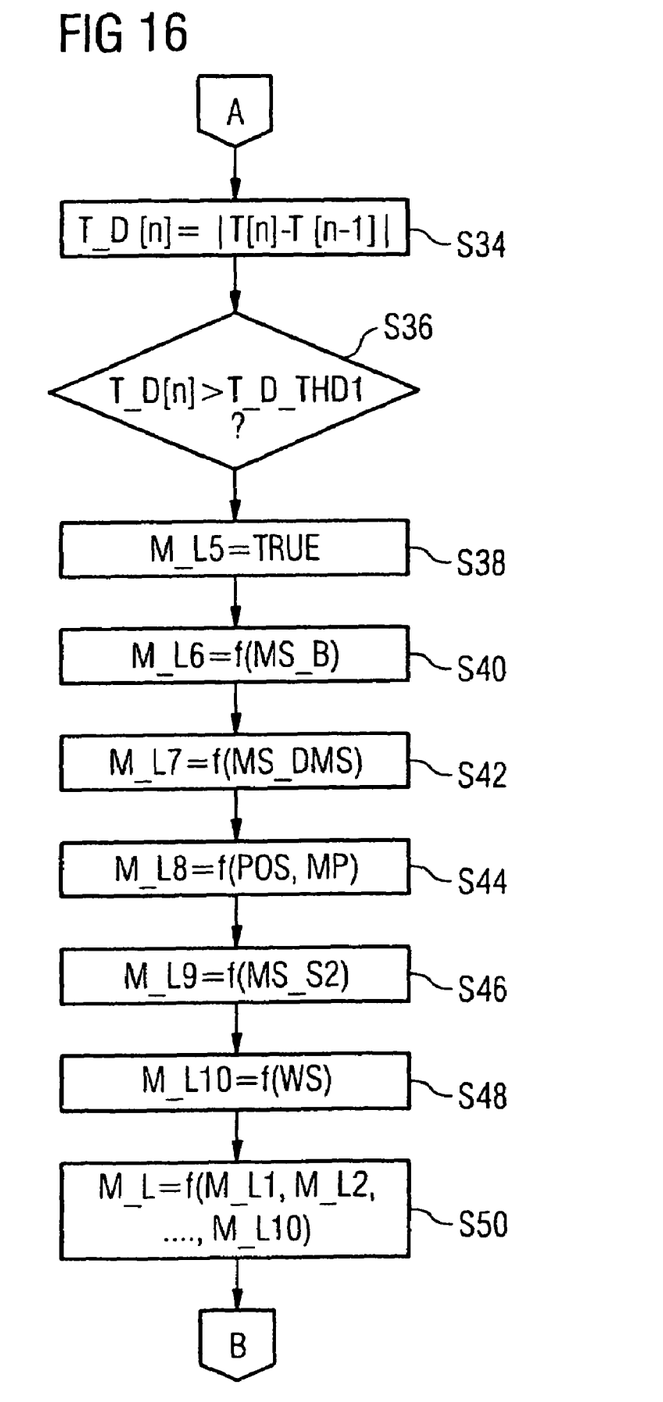

In step S34 a current temperature deviation T_D is established as a function of the magnitude of the difference between a current temperature T[n] and the last temperature T[n−1]. Alternatively, a temperature suitably far back in time can be used here too instead of the last temperature T[n−1].

Step S36 checks whether the current temperature deviation T_D[n] is greater than a temperature deviation threshold T_D_THD. The temperature deviation threshold T_D_THD is preferably predefined such that, when it is exceeded, the position POS of the sensor device 14 has very probably changed from its mounting position MP to another position POS. The temperature deviation threshold T_D_THD is thus preferably established by appropriate tests on the motor vehicle 1 or by simulations and is based on the perception that, while the motor vehicle 1 is travelling, the temperature of the wheel rim 10 frequently differs considerably from the temperature of the tire 12. If the condition in step S36 is fulfilled, a fifth "detached" flag M_L5 is assigned the truth value TRUE in a step S38. If, on the other hand, the condition in step S36 is not fulfilled, processing is continued in step S40.

In step S40 a sixth "detached" flag M_L6 is assigned the truth value TRUE according to whether the measurement signal MS_B of the acceleration sensor 22 exhibits a characteristic oscillation which is characteristic of a vibration caused by the detached sensor device 40 striking the inner wall of the tire or the wheel rim 10 or, at a high rotational speed, by the impact of the sensor device 14, which is pressed against the inner wall, on the point of contact with the roadway surface. The measure established for the characteristic oscillation can, for example, be its amplitude and can be compared with an appropriate threshold. The characteristic oscillation also has a frequency that correlates with the vehicle speed VS.

In step S42 a seventh "detached" flag M_L7 is or is not assigned the truth value TRUE, depending on a characteristic oscillation of a measurement signal MS_DMS of the deformation measuring element 48. The characteristic oscillation corresponds to that of the measurement signal MS_B of the acceleration sensor as described with reference to step S40. Step S44 determines whether or not an eighth "detached" flag M_L8 is assigned the truth value TRUE, depending on the position relative to the mounting position MP as registered by the position sensor. This is done by appropriate signal evaluation of the position sensor, which can, for example, contain the switch 40 or the first and second contacts 42, 44.

In step S46 a ninth "detached" flag M_L9 is then assigned or not assigned the truth value TRUE, depending on a measurement signal MS_S2 of the further sensor device 50. In this context, the measurement signal MS_S2 of the further sensor device 50 is evaluated in an equivalent manner to the measurement signal MS_B of the acceleration sensor 22.

In step S48 a tenth "detached" flag M_L10 is then assigned the truth value TRUE in the event of reception of the warning signal WS, which is transmitted by the monitoring unit 54 whenever it detects detachment of the sensor device 14 from its mounting position MP.

Furthermore, through a comparison of measurement signals associated with different sensor devices of different wheels, detachment of an individual sensor device 14, 16, 18, 20 can also be detected and a further "detached" flag can optionally be set.

Step S50 then establishes whether or not a main "detached" flag M_L is assigned the truth value TRUE. This is done according to the "detached" flags M_L$_1$ to M_μL10 established in the preceding steps. As a result of the inclusion of a plurality of "detached" flags M_L$_1$ to M_L10, detachment of the sensor device 14 from its mounting position MP can thus be correctly detected with improved reliability.

If the main "detached" flag M_L is assigned the truth value TRUE, an appropriate warning can then, for example, be signaled to the occupants of the motor vehicle 1 or, for example, an emergency function can be activated to ensure that the vehicle speed does not exceed a predefineable speed at which the detached sensor device 14 will in all probability severely damage the tire 12.

The program is also performed in relation to the further wheels and the sensor devices with which they are provided.

This application claims the priority, under 35 U.S.C. § 119, of German patent application No. 10 2004 037 875.4, filed Aug. 4, 2004; the entire disclosure of the prior application is herewith incorporated by reference.

I claim:

1. A method for monitoring a sensor device, which comprises the steps of:
    disposing the sensor device at a mounting position in a wheel; the sensor device containing an acceleration sensor outputting a measurement signal representative of acceleration of the sensor device;
    establishing a correlation coefficient in dependence on the measurement signal of the acceleration sensor and a square of a vehicle speed of a motor vehicle on which the wheel is disposed; and
    detecting detachment of the sensor device from the mounting position based on the correlation coefficient.

2. A method for monitoring a sensor device, which comprises the steps of:
    disposing the sensor device at a mounting position in a wheel; the sensor device containing an acceleration sensor outputting a measurement signal representative of an acceleration of the sensor device; and
    at a vehicle speed lower than a predefined vehicle speed threshold, detecting the detachment of the sensor device from the mounting position using a measure of a mutual deviation of a plurality of values, measured at time intervals, of the measurement signal of the acceleration sensor or of quantities derived therefrom.

3. A method for monitoring a sensor device, which comprises the steps of:
    disposing the sensor device at a mounting position in a wheel; the sensor device containing an acceleration sensor outputting a measurement signal representative of an acceleration of the sensor device; and
    at a vehicle speed higher than a predefined vehicle speed threshold, detecting the detachment of the sensor device from the mounting position if the measurement signal of the acceleration sensor falls below a predefined acceleration threshold or if the measurement signal does not change in correlation with the vehicle speed.

4. A method for monitoring a sensor device, which comprises the steps of:
    disposing the sensor device at a mounting position in a wheel;
    forming the sensor device to contain a temperature sensor; and
    detecting detachment of the sensor device from the mounting position based on a temperature deviation obtained from a difference of two temperatures registered by the temperature sensor.

5. A method for monitoring a sensor device, which comprises the steps of:
    attaching a sensor device to a mounting position in a wheel; and
    detecting detachment of the sensor device from the mounting position according to a measure of a signal strength of an information signal transmitted by the sensor device.

6. A device for monitoring a sensor unit, the device comprising:
    an evaluation unit detecting detachment of the sensor unit from a mounting position in a wheel; said evaluation unit detecting the detachment according to a measure of signal strength of an information signal transmitted by the sensor unit.

7. A sensor device to be disposed in a wheel at a mounting position, the sensor device comprising:
    a position sensor outputting a measurement signal representing a position of the sensor device in the wheel relative to the mounting position;

said position sensor selected from a group consisting of a first position sensor, a second position sensor, and a third position sensor;

said first position sensor being a magnetic field sensor;

said second position sensor including a switch having a position dependent upon the position of the sensor device in the wheel relative to the mounting position; and said third position sensor including an electric conductor disposed in the wheel and two contacts which are only electrically coupled to said electric conductor in the mounting position.

8. A sensor device to be disposed in a wheel at a mounting position, comprising:

at least one deformation measuring element disposed so that a measurement signal of said deformation measuring element exhibits a characteristic oscillation if the sensor device has become detached from the mounting position.

9. A method for monitoring a sensor device disposed in a wheel at a mounting position, the sensor device contains at least one deformation measuring element disposed so that a measurement signal of the deformation measuring element exhibits a characteristic oscillation if the sensor device becomes detached from the mounting position, which comprises the step of:

detecting a detachment of the sensor device from the mounting position in dependence on a measure of the characteristic oscillation of the measurement signal of the deformation measuring element.

10. A device for monitoring a sensor unit disposed in a wheel at a mounting position and having at least one deformation measuring element disposed so that a measurement signal of the deformation measuring element exhibits a characteristic oscillation if the sensor unit becomes detached from the mounting position, the device comprising:

an evaluation device detecting a detachment of the sensor unit from the mounting position in dependence on a measure of the characteristic oscillation of the measurement signal of the deformation measuring element.

11. A system, comprising:

a first sensor device to be disposed in a wheel at a mounting position; and a second sensor device having a sensor element for detecting vibrations transferred to the wheel by said first sensor device if said first sensor device becomes detached from said mounting position.

12. The system according to claim 11, wherein said second sensor device is disposed on the wheel.

13. The system according to claim 11, wherein said second sensor device is disposed on a component of a motor vehicle, said component is connected to the wheel such that vibrations of the wheel are transferred to the component.

14. The system according to claim 11, further comprising a mechanical vibration element disposed such that, when said first sensor device becomes detached from said mounting position, said mechanical vibration element is excited and vibrates.

* * * * *